United States Patent
Yamamoto et al.

(10) Patent No.: US 9,764,474 B2
(45) Date of Patent: Sep. 19, 2017

(54) ROBOT SYSTEM IN WHICH BRIGHTNESS OF INSTALLATION TABLE FOR ROBOT IS CHANGED

(71) Applicant: FANUC Corporation, Yamanashi (JP)

(72) Inventors: Tomoyuki Yamamoto, Yamanashi (JP); Takeaki Aramaki, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 5 days.

(21) Appl. No.: 15/004,008

(22) Filed: Jan. 22, 2016

(65) Prior Publication Data
US 2016/0214259 A1 Jul. 28, 2016

(30) Foreign Application Priority Data
Jan. 27, 2015 (JP) ................. 2015-013659

(51) Int. Cl.
| | |
|---|---|
| *B25J 9/00* | (2006.01) |
| *B25J 9/16* | (2006.01) |
| *B25J 19/06* | (2006.01) |
| *H05B 37/02* | (2006.01) |
| *B25J 19/02* | (2006.01) |
| *F16P 3/14* | (2006.01) |

(52) U.S. Cl.
CPC .......... *B25J 9/1676* (2013.01); *B25J 9/0009* (2013.01); *B25J 9/1674* (2013.01); *B25J 19/022* (2013.01); *B25J 19/06* (2013.01); *F16P 3/144* (2013.01); *H05B 37/0227* (2013.01); *G05B 2219/40196* (2013.01); *G05B 2219/40203* (2013.01); *Y02B 20/44* (2013.01); *Y02B 20/445* (2013.01); *Y10S 901/01* (2013.01); *Y10S 901/02* (2013.01); *Y10S 901/47* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,398,720 | A * | 8/1983 | Jones | A63F 3/00643 273/238 |
| 8,108,092 | B2 * | 1/2012 | Phillips | G05D 1/0033 700/245 |
| 2002/0193908 | A1 * | 12/2002 | Parker | G06N 3/008 700/258 |
| 2003/0076224 | A1 | 4/2003 | Braune | |

(Continued)

FOREIGN PATENT DOCUMENTS

| | | |
|---|---|---|
| CN | 103192414 A | 7/2013 |
| JP | 2010-208002 A | 9/2010 |

(Continued)

*Primary Examiner* — Jonathan L Sample
(74) *Attorney, Agent, or Firm* — Hauptman Ham, LLP

(57) ABSTRACT

A robot system comprises an intrusion detector which detects that a person has entered into a monitoring area established around a robot, an installation table which supports the robot, a light emitting device which brightens a surface of the installation table, and a control device which receives a signal outputted by the intrusion detector and controls the light emitting device. The control device causes the light emitting device to emit light when it is detected that the person has entered into the monitoring area.

5 Claims, 8 Drawing Sheets

(56) References Cited

U.S. PATENT DOCUMENTS

| | | | | |
|---|---|---|---|---|
| 2007/0192910 A1* | 8/2007 | Vu | ............................ | B25J 5/007 700/245 |
| 2007/0290621 A1* | 12/2007 | Clark | ........................ | F21S 2/00 315/113 |
| 2008/0009970 A1* | 1/2008 | Bruemmer | ............ | G05D 1/0088 700/245 |
| 2008/0306629 A1* | 12/2008 | Chiang | ............... | G07C 9/00111 700/245 |
| 2009/0152664 A1* | 6/2009 | Klem | ................ | H01L 27/14603 257/440 |
| 2010/0137880 A1* | 6/2010 | Nahum | ................... | A61B 34/70 606/130 |
| 2011/0106339 A1* | 5/2011 | Phillips | ................. | G05D 1/0033 701/2 |
| 2011/0196563 A1* | 8/2011 | Yturralde | .............. | G05D 1/0234 701/25 |
| 2011/0309236 A1* | 12/2011 | Tian | ................... | H01L 27/14603 250/208.1 |
| 2012/0239191 A1* | 9/2012 | Versteeg | ................. | G06N 3/004 700/246 |
| 2014/0277847 A1* | 9/2014 | Cann | ......................... | B25J 5/007 701/2 |
| 2014/0288707 A1* | 9/2014 | Asahi | ..................... | B25J 9/1674 700/253 |
| 2015/0088310 A1* | 3/2015 | Pinter | .................... | G06Q 50/22 700/253 |
| 2016/0184032 A1* | 6/2016 | Romo | .................... | A61B 10/04 606/130 |
| 2016/0195856 A1* | 7/2016 | Spero | ..................... | G06N 5/046 700/90 |

FOREIGN PATENT DOCUMENTS

| | | |
|---|---|---|
| JP | 4990504 B2 | 8/2012 |
| JP | 5035768 B2 | 9/2012 |
| JP | 2014-148027 A | 8/2014 |

* cited by examiner

ROBOT SYSTEM IN WHICH BRIGHTNESS OF INSTALLATION TABLE FOR ROBOT IS CHANGED

RELATED APPLICATIONS

The present application claims priority to Japanese Application Number 2015-013659, filed Jan. 27, 2015, the disclosure of which is hereby incorporated by reference herein in its entirety.

BACKGROUND OF THE INVENTION

1. Field of the Invention

The present invention relates to a robot system including an installation table for a robot.

2. Description of the Related Art

Robots are formed to be capable of changing their position and posture with time. In recent years, a robot system comprising a robot which automatically operates based on an operation program and a control device which controls the robot are used. However, a situation sometimes occurs in which an operator carelessly contacts the robot when the robot is in operation. When the operator contacts the robot, there is a possibility that the operator may be harmed by the robot or the robot may be damaged.

In Japanese Patent No. 5,035,768 Publication, a safety device for a robot is disclosed which stops the operation of the robot or limits the speed of the robot when an operator has entered into a working range of the robot. It is disclosed to prevent a possibility that the robot collides with the operator by controlling the operation of the robot.

In Japanese Patent No. 4,990,504 Publication, a robot system is disclosed which includes a plurality of manipulators and in which a revolving light is mounted on an arm of each manipulator. It is disclosed that in the robot system, the operator is informed that a manipulator is selected as a manipulation object, via the revolving light of the manipulator that is lit.

In the above Japanese Patent No. 5,035,768 Publication, it is disclosed to control the operation of the robot when the operator has entered into the working range of the robot. More specifically, an apparatus is disclosed which reduces an influence occurring when a person contacts the robot. However, it is preferable that a person such as operator or the like does not approach the robot during a time period that the robot is operating since there is a possibility that the robot drives fast or performs an irregular operation.

In the above patent publication, no method is disclosed for informing the operator of the operating state of the robot. More specifically, no method is disclosed for informing the operator of the operating state of the robot such as whether the robot is performing a normal operation, whether the robot is stopped, or whether the robot is speed limited. Thus, there is a possibility that the operator carelessly approaches and contacts the robot since the operator has no knowledge of the operating state of the robot.

SUMMARY OF THE INVENTION

The robot system according to the present invention comprises an intrusion detector which detects that a person has entered into a monitoring area established around a robot, an installation table which supports the robot, a light emitting device which brightens at least part of surfaces of the installation table, and a control device which receives a signal outputted by the intrusion detector and controls the light emitting device. The control device causes the light emitting device to emit light when it is detected that the person has entered into the monitoring area.

In the above invention, the light emitting device preferably blinks when it is detected that the person has entered into the monitoring area.

In the above invention, the monitoring area includes a stopping area in which the operation of the robot is stopped when the person has entered thereinto and a speed limiting area in which the operation speed of the robot is limited to a low speed when the person has entered thereinto, the intrusion detector is formed to be capable of detecting the intrusion of the person into the stopping area and the intrusion of the person into the speed limiting area separately, the control device includes a light emission control unit which controls the color of the light emitted by the light emitting device, and the light emission control unit preferably performs at least one of the control for changing the color of the light emitted by the light emitting device and the control for causing the light emitting device to be lit off, depending on the case where the person has entered into the stopping area, the case where the person has entered into the speed limiting area, or the case where the person does not intrude into the both areas of stopping area and the speed limiting area.

In the above invention, the monitoring area includes a stopping area in which the operation of the robot is stopped when the person has entered thereinto and a speed limiting area in which the operation speed of the robot is limited to a low speed when the person has entered thereinto, the intrusion detector is formed to be capable of detecting the intrusion of the person into the stopping area and the intrusion of the person into the speed limiting area separately, the control device includes a light emission control unit which controls time intervals at which the light emitting device blinks, and the light emission control unit preferably controls at least one of whether or not the light emitting device blinks and the blinking time intervals, depending on the case where the person has entered into the stopping area, the case where the person has entered into the speed limiting area, or the case where the person does not intrude into the both areas of the stopping area and the speed limit area.

In the above invention, a moving device which moves the installation table is provided, the monitoring area is moved with the movement of the installation table, and the intrusion detector is fixed to and moved with the installation table, and can be formed to be capable of detecting that the person has entered into the monitoring area established at a position to which the installation table is moved.

DETAILED DESCRIPTION

Figure 1:
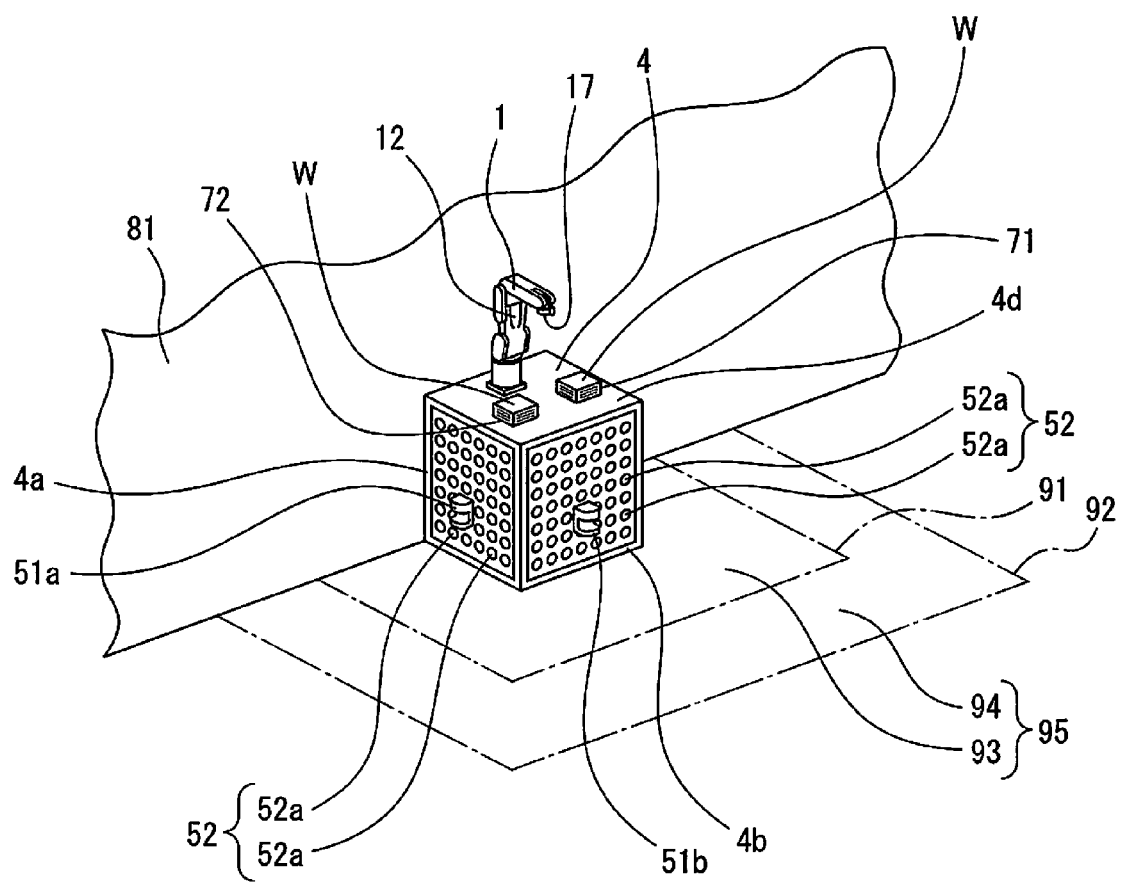
FIG. 1 is a schematic perspective view of a first robot system in an embodiment.
Figure 2:
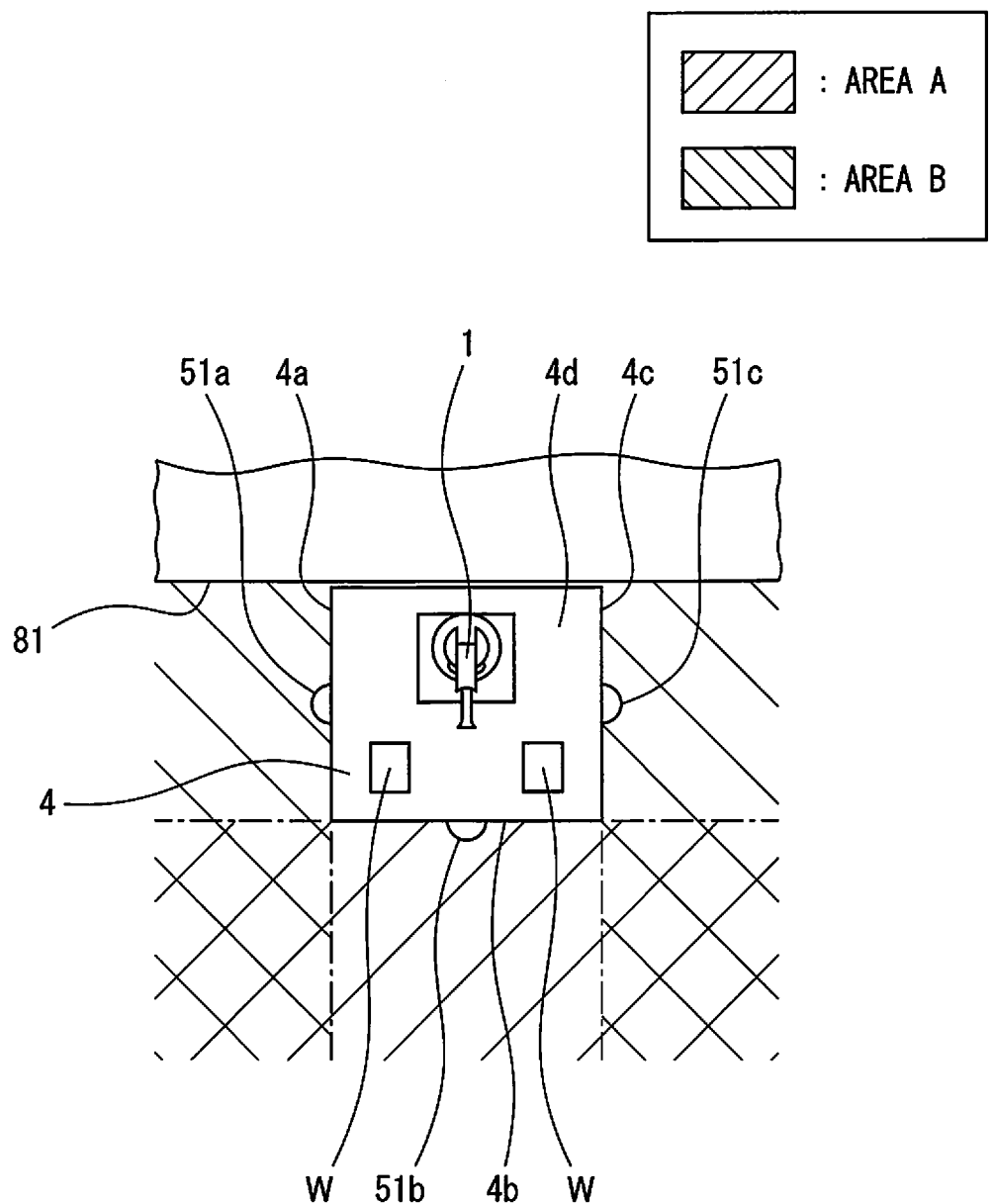
FIG. 2 is a schematic plan view of the first robot system in the embodiment.

Referring to FIGS. 1 through 8, description will be made of a robot system in an embodiment. FIG. 1 shows a schematic perspective view of a first robot system in the present embodiment. FIG. 2 shows a schematic plan view of the first robot system in the present embodiment. Referring to FIGS. 1 and 2, the robot system includes a robot 1 and a hand 17, which perform a transportation of a workpiece W. The robot 1 of the present embodiment is an articulated robot. The hand 17 of the present embodiment is an adsorption hand which retains a workpiece via adsorption. An arm 12 of the robot 1 is formed so as to be changed in posture and rotated.

The first robot system includes an installation table 4 fixed on a floor. The installation table 4 of the present embodiment is formed in a rectangular parallelepiped shape. The surfaces of the installation table 4 include side surfaces 4a to 4c, and an upper surface 4d. In the first robot system, the installation table 4 is located adjacent to a wall 81. Thus, one of the side surfaces is close to the wall 81. The upper surface 4d serves as a working surface for workpieces W. The workpiece W prior to being transported is located at a first position 71. The robot 1 moves the workpiece W from the first position 71 to a second position 72. A plurality of workpieces W located at the first position 71 are not uniform in direction. The robot 1 adjusts the directions of the workpieces W and moves the workpieces W to the second position 72.

In the robot system, a case sometimes occurs in which a person such as operator or the like approaches the robot 1. The robot system of the present embodiment includes laser scanner devices 51a to 51c as intrusion detector which detects that a person approaches the robot 1. Each of the laser scanner devices 51a to 51c is mounted at a height where it can detect a person approaching the robot 1.

The laser scanner devices 51a to 51c of the present embodiment include a laser oscillator and a laser receiver. The laser oscillator is a pulse laser oscillator which emits laser light in an infrared range, for example. The laser light is reflected at a surface of an object to be detected and returned to the laser scanner devices 51a to 51c. The laser receiver detects the returned laser light. The laser scanner devices 51a to 51c detect a time length from when the laser light is emitted from them to when it returns to them. Thus, the laser scanner devices 51a to 51c can calculate a distance from the laser scanner devices 51a to 51c to the object based on the time during which the laser light reciprocates.

The laser scanner devices 51a to 51c of the present embodiment are formed so that the laser oscillator and the laser receiver rotate within a housing. The laser light is oscillated in a direction perpendicular to the axis of rotation. In this manner, the distance to the object can be measured at any rotation angle of the laser oscillator. The laser scanner devices 51a to 51c can detect the direction and distance to where the object exists. In other words, the laser scanner devices 51a to 51c can detect the position of the object.

The laser scanner devices 51a to 51c of the present embodiment are arranged so that the rotation axes of the laser oscillator and the laser receiver each extend in a vertical direction. Thus, it is possible to emit laser light in a horizontal direction and detect whether or not a person exists in a horizontal plane at the height where the laser oscillator is located. The laser oscillator and the laser receiver of the laser scanner devices 51a to 51c in the present embodiment are formed to be rotatable at a rotation angle within a 180-degree range. In this manner, the laser scanner devices 51a to 51c can detect the position of a person at a measurement angle within a 180-degree range.

Referring to FIG. 2, the laser scanner device 51b can detect the position of a person who intruded in an area A. The laser scanner devices 51a and 51c can detect the position of a person who intruded in an area B. In an area where the areas A and B intersect, the position of a person can be detected by the laser scanner devices 51a, 51c and the laser scanner device 51b.

While, in the present embodiment, the installation table is formed in a rectangular parallelepiped shape and one laser scanner device is provided on one side surface of the installation table, there is no limitation thereto, and the installation table may be formed in any shape. The laser scanner devices may be provided in a manner to be capable of detecting a person who approaches the installation table. For example, when the installation table is formed in a rectangular parallelepiped shape and a laser scanner device having a measurement range of 270 degrees is used, it is possible to provide the laser scanner device at two corners of the installation table.

Referring to FIG. 1, in the robot system of the present embodiment, a monitoring area 95 is established beforehand as an area in which the operation of the robot 1 is limited when a person approaches the robot 1. The monitoring area 95 is established around the robot 1. The monitoring area 95 includes a stopping area 93 surrounding the installation table 4 and a speed limiting area 94 established outside the stopping area 93. The inside of a border line 91 is the stopping area 93. An area between the border line 91 and a border line 92 is the speed-limiting area 94.

When a person has entered into the stopping area 93, control is performed to stop the robot 1. When a person has entered into the speed limiting area 94, control is performed to limit the operation speed of the robot to a low speed. The area outside the border line 92, i.e., the area outside the monitoring area 95 is an area where there is a sufficient distance from the robot 1 and thus no limitation is laid on the operation speed of the robot 1.

The stopping area 93 and the speed limiting area 94 in the present embodiment are established along the planar shape of the installation table 4. In other words, the areas are established to be substantially square in a plan view. The stopping areas 93 and the speed limiting area 94 are not limited to such a shape but may be established within an arbitrary range. For example, the stopping area and the speed limiting area may be established in a semi-circular shape with the installation table as the center.

Further, the monitoring area 95 of the present embodiment includes the stopping area 93 and the speed limiting area 94 but is not limited thereto and an arbitrary area may be established. For example, the monitoring area may be established in such a manner as to provide only the stopping area without providing the speed limiting area. Alternatively, a plurality of speed limiting areas may be provided, and control may be performed so that the operation speed of the robot is limited to be lower as a person approaches closer to the robot.

Figure 3:
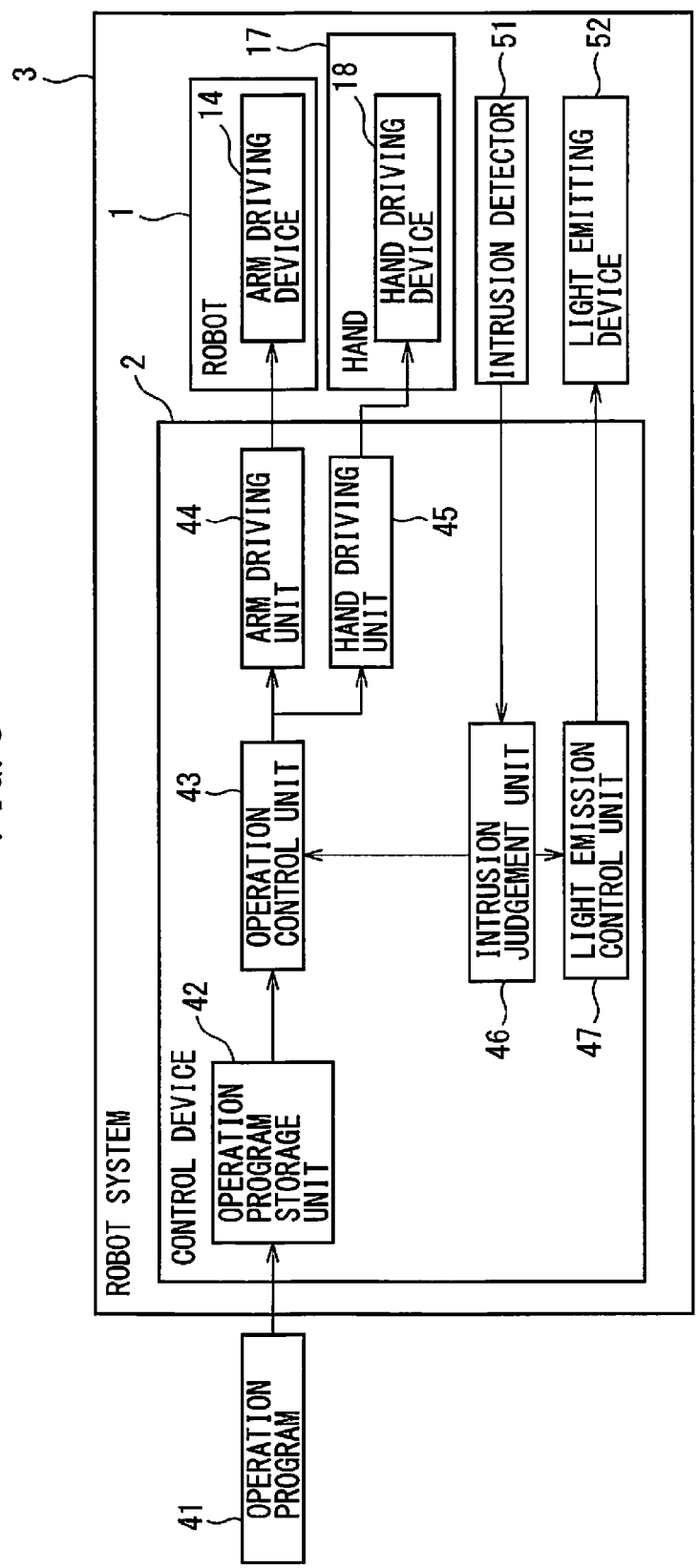
FIG. 3 is a block diagram of the first robot system in the embodiment.

FIG. 3 shows a block diagram of the robot system according to the present embodiment. In the present embodiment, description is made, by way of example, of control for transporting the workpiece W based on an operation program 41. Referring to FIGS. 1 and 3, the robot system 3 includes a control device 2 which controls the robot system 3. The control device 2 includes a digital computer having CPU (Central Processing Unit), RAM (Random Access Memory), ROM (Read Only Memory), and the like, which are connected with each other via a bus. The robot 1 is activated based on an operation command from the control device 2.

The robot 1 includes an arm driving device 14 which drives a joint part of each arm 12. The arm driving device 14 includes an arm driving motor provided in the joint part, for example. The arm 12 can be bent at a desired angle and rotated at the joint part by being driven by the arm driving device 14. The hand 17 is provided with a hand driving device 18. The hand driving device 18 includes an adsorption pump, for example. The hand 17 can grip and release the workpiece W by being driven by the hand driving device 18. The arm driving device 14 and the hand driving device 18 are controlled by the control device 2.

An operation program 41, which is formed beforehand to operate the robot 1, is inputted to the control device 2. The operation program 41 is stored in an operation program storage unit 42. An operation control unit 43 sends out an operation command for driving the robot 1 based on the operation program. The operation control unit 43 sends out an operation command for driving the arm driving device 14 to the arm driving unit 44. The arm driving unit 44 includes an electric circuit for driving the arm driving motor or the like and supplies electric power to the arm driving device 14 based on the operation command.

Further, the operation control unit 43 sends out an operation command for driving the hand driving device 18 to a hand driving unit 45. The hand driving unit 45 includes an electric circuit for driving an adsorption pump or the like and supplies electric power to the adsorption pump or the like based on the operation command. In this manner, the robot system 3 can automatically transport a workpiece from an initial position to a target position via driving by the robot 1 and the hand 17.

An intrusion detector 51 is formed to be capable of detecting an intrusion of a person into the stopping area and an intrusion of a person into the speed limiting area separately. The control device 2 includes an intrusion judgement unit 46 which receives a signal outputted by the intrusion detector 51. The intrusion detector 51 can detect a position where a person exists. In the first robot system, the laser scanner devices 51a to 51c detect the position of the person. The intrusion judgement unit 46 judges an area in which the person exists, based on a pre-set range for the monitoring area 95. In other words, the intrusion judgement unit 46 judges whether the person exists in the stopping area 93, whether the person exists in the speed limiting area 94, or whether the person exists outside the monitoring area 95.

When it is judged that a person exists in the stopping area 93 or the speed limiting area 94, the intrusion judgement unit 46 transmits to the operation control unit 43 a signal indicating that a person exists in the stopping area 93 or the speed limiting area 94. When a person exists in the stopping area 93, the operation control unit 43 sends out an operation command for stopping the robot 1. For example, the control device 2 performs control for stopping the arm driving device 14. When a person exists in the speed limiting area 94, the operation control unit 43 performs control for limiting the operation speed of the robot 1 to a low speed. In the present embodiment, the operation speed of the arm 12 is set at an upper limit. When the speed of the arm 12 exceeds the upper limit speed during normal operation, control is performed so that the speed of the robot 1 becomes the upper limit speed. The control for limiting the operation speed of the robot 1 to a low speed is not limited to such a form but control may be performed, for example, to make a speed reduction with respect to all operations of the arm 12. By performing control to limit the operation speed of the robot 1 to a low speed, it is possible to mitigate effects when a person contacts the robot 1. Thus, when a person has approached the robot 1, a limitation is imposed on the operation of the robot 1.

Referring to FIG. 1, the robot system 3 of the present embodiment is provided with a light emitting device 52 which brightens the surface of the installation table 4 supporting the robot 1. The light emitting device 52 includes a plurality of LED (Light Emitting Diode) lights 52a. The LED lights 52a are fitted in the side surfaces 4a to 4c of the installation table 4. As a result of the plurality of LED lights 52a being lit, the brightness of each of the side surfaces 4a to 4c is increased. In other words, the side surfaces 4a to 4c are brightened.

The LED lights 52a of the present embodiment are formed to be capable of emitting light in a plurality of colors. The LED lights 52a are capable of emitting green, yellow and red light. Thus, the color of the side surfaces 4a to 4c when the installation table 4 is viewed can be made green, yellow or red.

Referring to FIG. 3, the control device 2 includes a light emission control unit 47 which controls the light emitting device 52. The light emitting device 52 is controlled by the light emission control unit 47. The light emitting device 52 is lit on and off in accordance with a command from the light emission control unit 47. Further, the light emitting device 52 changes the color of the light emitted therefrom in accordance with a command from the light emission control unit 47. Further, the light emitting device 52 is formed to blink on and off in accordance with a command from the light emission control unit 47.

When no person exists in the monitoring unit 95, the intrusion judgement unit 46 sends out a corresponding signal to the light emission control unit 47. The light emission control unit 47 causes the light emitting device 52 to be lit in a predetermined color and lit off. When a person has entered into the stopping area 93 or the speed limiting area 94, the intrusion judgement unit 46 sends out a corresponding signal to the light emission control unit 47. The light emission control unit 47 causes the light emitting device 52 to be lit. The light emission control unit 47 of the present embodiment performs control to change the light-emitting form of the light emitting device 52 depending on the area into which a person has entered. The light emitting form includes continuous lighting, lighting-off, blinking, the color of the light, or the like.

Figure 4:
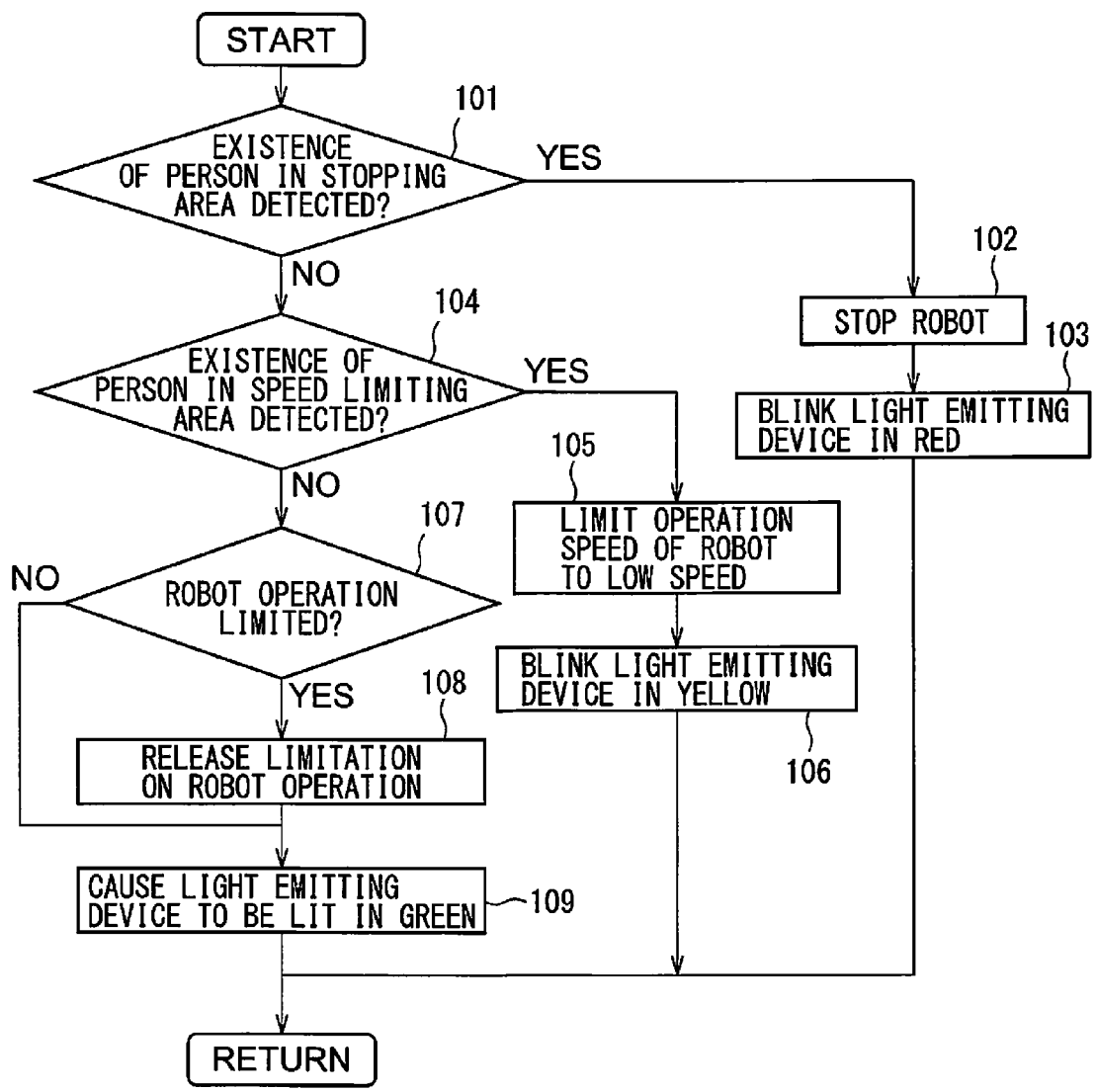
FIG. 4 is a flow chart for controlling a light emitting device in the embodiment.

FIG. 4 shows a flow chart of the control of the light emitting device in the present embodiment. The control illustrated in FIG. 4 can be repeatedly performed at predetermined time intervals. Further, the control can be performed not only during a time period when the robot 1 is driving but also during a time period when the robot 1 is stopped.

Referring to FIGS. 3 and 4, at step 101, the intrusion judgement unit 46 judges whether or not a person exists in the stopping area 93. In other words, it is judged whether or not a person intruded into the stopping area 93. When a person exists in the stopping area 93, the procedure proceeds to step 102. At step 102, the operation control unit 43 causes the robot 1 to be stopped. In particular, the operation control unit 43 causes the arm driving device 14 to be stopped.

Then, at step 103, the light emission control unit 47 controls the light emitting device 52 so that it blinks with red light. In other words, lighting-on and off with red light is repeated at predetermined time intervals. The side surfaces 4a to 4c of the installation table 4 become red and dark. In this manner, a person can be informed that he exists in the stopping area 93 and given an attention.

At step 101, when no person exists in the stopping area 93, the procedure proceeds to step 104.

At step 104, the intrusion judgement unit 46 judges whether or not a person exists in the speed limiting area 94. When it is detected that a person exists in the speed limiting area 94, the procedure proceeds to step 105. At step 105, the operation control unit 43 limits the operation speed of the robot 1 to a low speed. Then, at step 106, the light emission control unit 47 controls the light emitting device 52 so that it blinks with yellow light. The side surfaces 4a to 4c of the installation table 4 become yellow and dark. Thus, a person can be informed that he exists in the speed limiting area 94 and given an attention.

At step 104, when a person does not exist in the speed limiting area 94, the procedure proceeds to step 107. This instance is in a state in which a person does not intrude into the both areas of the stopping area 93 and the speed limiting area 94. In other words, it is a state in which a person does not exist in the monitoring area 95.

At step 107, in the current control, it is judged whether or not the operation of the robot 1 is limited. In other words, it is judged whether or not the robot 1 is stopped or whether or not the operation speed of the robot 1 is limited to a low speed. At step 107, when the operation of the robot 1 is limited, the procedure proceeds to step 108.

At step 108, the operation control unit 43 releases the operation of the robot from being limited. Then, the procedure proceeds to step 109. At step 107, when the operation of the robot is not limited, the procedure proceeds to step 109.

At step 109, the light emission control unit 47 controls the light emitting device 52 so that it is continuously lit with green light. A person can be informed that he is outside the monitoring area 95.

In this manner, in the robot system of the present embodiment, the light-emitting form can be changed depending on the case where a person has entered into the stopping area 93, the case where a person has entered into speed limiting area 94, or the case where a person does not intrude into the both areas of stopping area 93 and the speed limiting area 94. A person existing around the robot 1 can easily recognize in which area he exists. Further, because of the light-emitting form of the light emitting device 52 being changed, a person's attention can be called even when the person pays no attention to the robot 1. In this manner, a person can be restrained from carelessly approaching and contacting the robot 1. Meanwhile, a case sometimes occurs in which a plurality of persons intrude into the monitoring area 95. Further, when a person exists in the stopping area 93 and further a person also exists in the speed limiting area 94, the control for the case where a person has entered into the stopping area 93 can be performed as the control of the present embodiment.

In the present embodiment, when it is detected that a person has entered into the monitoring area 95, control is performed so that the light emitting device 52 blinks on and off. By adopting this configuration, it is possible to easily recognize that a person intruded into an area to which attention should be paid. Also, it is possible to draw a person's attention.

Further, the light emission control 47 performs control to change the color of the light emitted by the light emitting device 52 depending on the case where a person has entered in the stopping area 93, the case where a person has entered into the speed limiting area 94, or the case where a person does not intrude into the both areas of the stopping area 93 and the speed limiting area 94. By adopting this configuration, it is possible to easily recognize in which area a person exists.

Meanwhile, the control to change the light-emission form is not limited to the control to change the color of the light emitted by light emitting device 52, but control may be performed so that the light emitting device 52 is lit off. For example, when a person exists outside the monitoring area 95, control may be performed so that the light emitting device 52 is lit off.

Further, the light emission control unit 47 controls whether or not the light emitting device 52 blinks, depending on the case where a person has entered into the stopping area 93, the case where a person has entered in the speed limiting area 94, or the case where a person does not intrude into the both areas of stopping area 93 and the speed limiting area 94. By adopting this configuration, it is possible to easily recognize in which area a person exists. Also, it is possible to draw a person's attention.

Further, while, in the present embodiment, the color of the light emitted by the light emitting device 52 is changed for each of the areas, there is no limitation to such a form, and the emitted light may be of single color. In this instance, it is possible to draw a person's attention by controlling the time intervals of lighting-off and blinking. For example, when a person exists outside the monitoring area 95, control can be performed to cause the light emitting device 52 to be lit off. When a person exists in the speed limiting area 94, control can be performed to cause the light emitting device 52 to be lit on. Further, when a person exists in the stopping area 93, control can be performed to cause the light emitting device 52 to blink on and off.

When a person exists in the speed limiting area 94, it is possible to cause the light emitting device 52 to blink at relatively long time intervals. When a person exists in the stopping area 93, it is possible to cause the light emitting device 52 to flash at relatively short time intervals. In other words, when a person exists in the stopping area 93, it is possible to make the blinking time intervals shorter than when a person exists in the speed limiting area 94. Even with such control, it is possible to recognize in which area a person exists. Also, it is possible to draw a person's attention.

Further, the intrusion detector is not limited to a laser scanner device, and any type of detector may be adopted which can detect that a person has entered into an area established around the robot.

Figure 5:
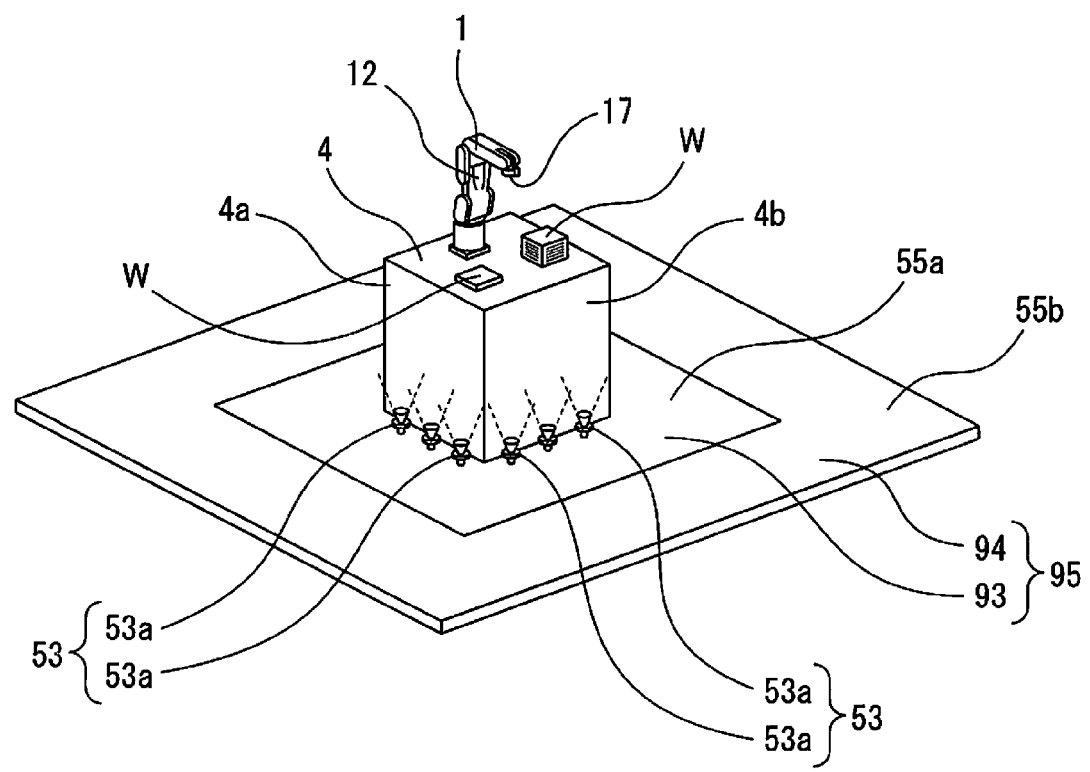
FIG. 5 is a schematic perspective view of a second robot system in the embodiment.

FIG. 5 shows a schematic perspective view of a second robot system in the present embodiment. In the second robot system, no wall exists at the rear surface of the installation table 4, and the robot 1 is located in a released space.

The second robot system includes mat switch devices 55a and 55b as an intrusion detector. The mat switch device 55a is formed so as to correspond to the shape of the stopping area 93. The mat switch device 55b is formed so as to correspond to the shape of the speed limiting area 94. In this manner, the two mat switch devices 55a and 55b are arranged inside the monitoring area 95.

Referring to FIGS. 5 and 3, the mat switch devices 55a and 55b have, for example, a structure so that a tape-like switch element is interposed between an upper rubber plate and a lower rubber plate which are disposed in opposing relationship to each other. The switch element includes an upper conductive plate and a lower conductive plate, which are spaced apart from each other. By the mat switch devices 55a and 55b being depressed, the upper conductive plate and the lower conductive plate are brought into contact with each other so that the conduction is detected. For example, when a person has entered into the stopping area 93, the mat switch device 55a is stepped on. Thereupon, the conduction of the switch element of the mat switch device 55a is detected. The intrusion judgement unit 46 judges that a person exists in the stopping area 93. Further, when the conduction of the switch element of the mat switch device 55b is detected, the intrusion judgement unit 46 judges that a person exists in the speed limiting area 94. As such, the control device 2 can judge whether or not a person exists in each of the areas, based on the conduction state of the mat switch devices 55a and 55b.

In the second robot system, no wall is arranged around the installation table 4. Hence, the monitoring area 95 including the stopping area 93 and the speed limiting area 94 is established in such a manner as to surround the installation table 4. As will be appreciated, the monitoring area 95 may be arbitrarily established depending on the location where the robot 1 is installed and the situation in which a person approaches the robot 1.

The second robot system includes a light emitting device 53. The light emitting device 53 includes a plurality of illumination lights 53a. The illumination lights 53a are arranged at the bottom of the installation table 4 and formed so as to illuminate the four side surfaces 4a and 4b of the installation table 4. The illumination lights 53a may be composed of LED lights, for example. As will be appreciated, the light emitting device is not limited to the form of being embedded in the surfaces of the installation table, but may be formed so as to illuminate the surfaces of the installation table.

Further, while the light emitting device of the present embodiment is formed to brighten the side surfaces the installation table, it is not limited to such a form but may be formed to brighten the upper surface of the installation table. In other words, the light emitting device may adopt any configuration in so far as it is capable of brightening at least part of the surfaces of the installation table.

Figure 6:
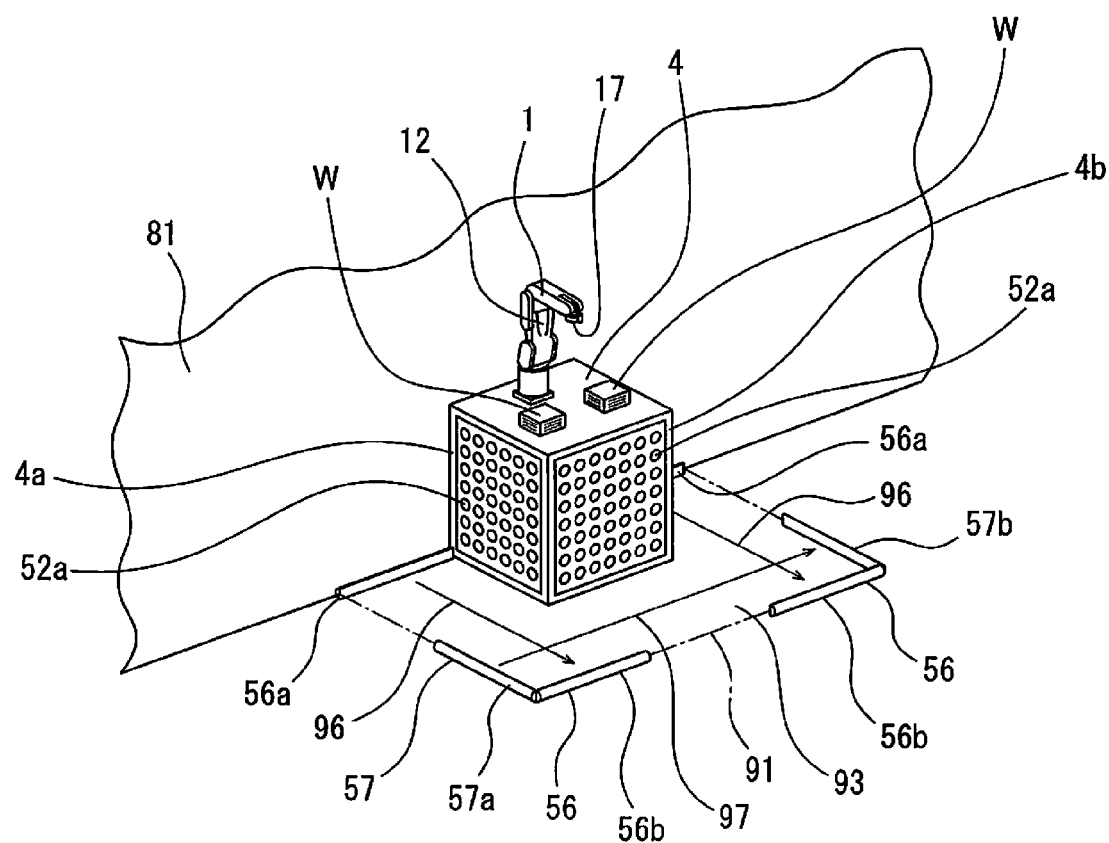
FIG. 6 is a schematic perspective view of a third robot system in the embodiment.

FIG. 6 shows a schematic perspective view of a third robot system in the present embodiment. The third robot system is different from the first robot system in respect of intrusion detector 51. The intrusion detector 51 of the third robot system is light curtain devices 56 and 57. In the example illustrated in FIG. 6, there are depicted the light curtain devices arranged for detection of the stopping area 93 of the monitoring area.

The light curtain device 56 includes a light projector 56a formed in a rod-like shape and a light receiver 56b formed in a rod-like shape. The light projector 56a emits a plurality of lights toward the light receiver 56b as depicted by arrows 96. The light receiver 56b detects light reception. The light projector 56a and the light receiver 56b are arranged so that their longitudinal directions are horizontal. The light projector 56a and the light receiver 56b are located at a low position capable of detecting a person. In the present embodiment, the light projector 56a and the light receiver 56b are placed on the floor. The light curtain device 57 has a structure similar to the light curtain device 56. The light curtain device 57 is formed so that light emitted by the light projector 57a is received at the light receiver 57b, as depicted by an arrow 97.

Referring to FIGS. 6 and 3, when a person has entered into an area between the light projector 56a and the light receiver 56b, at least part of the plurality of lights is interrupted. The light curtain device 56 detects that at least part of the lights is interrupted. In such an instance, the intrusion detector 46 judges that a person intruded into the area between light projector 56a and the light receiver 56b. In other words, the intrusion detector 46 judges that a person exists in the stopping area 93. Likewise also with the light curtain device 57, it is detected that at least part of the lights is interrupted. In this manner, the intrusion judgement unit 46 determines that a person exists in the stopping area 93.

In the example illustrated in FIG. 6, the intrusion of a person into the stopping area 93 is detected by three light curtain devices 56, 57. Also when the speed limiting area 94 is provided, a configuration may be adopted, which is similar to that of the light curtain devices arranged in the stopping area 93.

Figure 7:
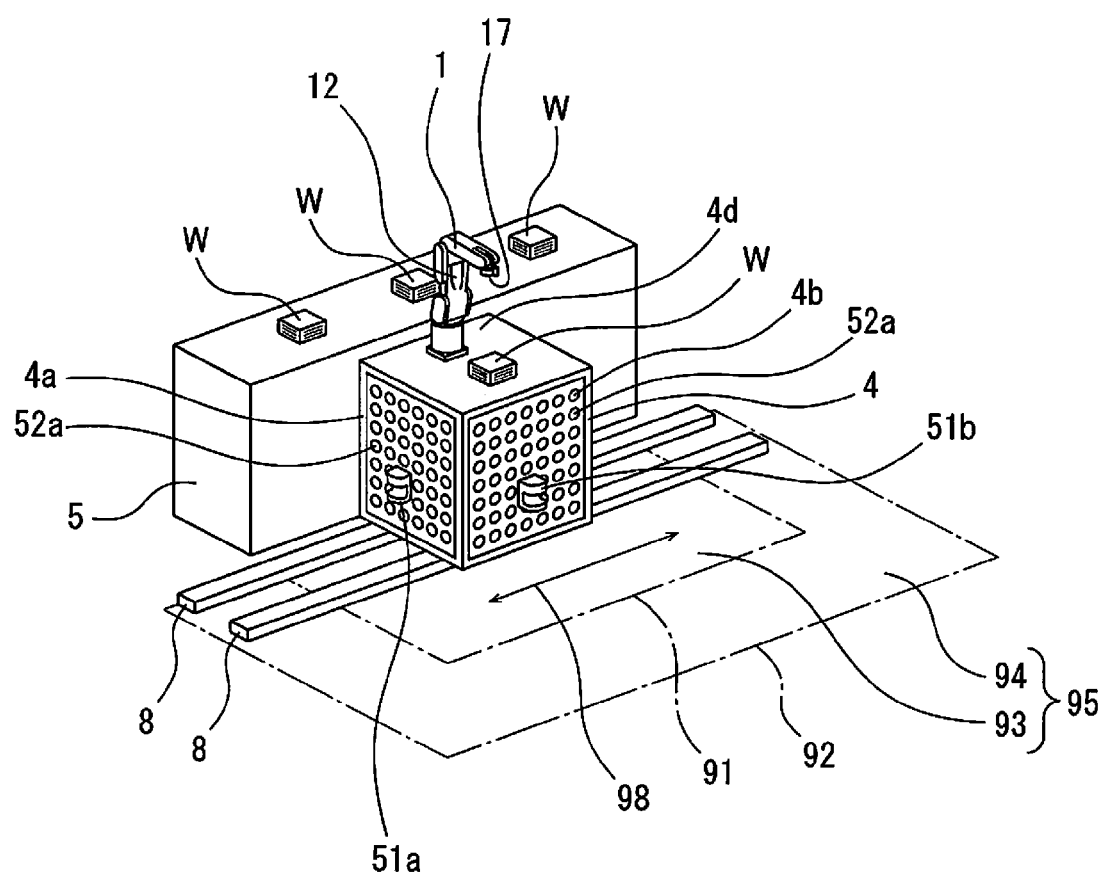
FIG. 7 is a schematic perspective view of fourth robot system in the embodiment.
Figure 8:
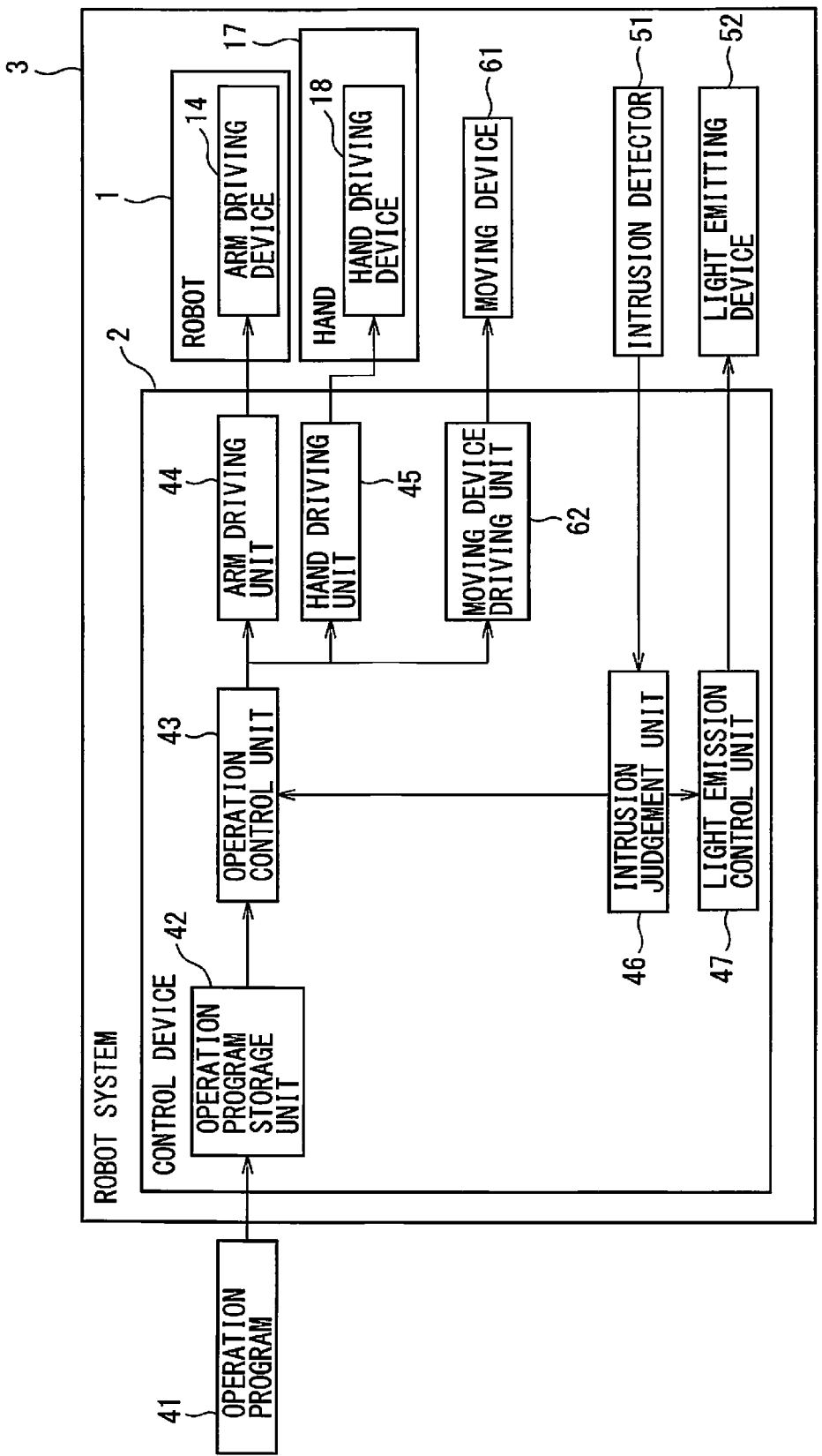
FIG. 8 is a block diagram of the fourth robot system in the embodiment.

FIG. 7 shows a schematic perspective view of a fourth robot system in the present embodiment. FIG. 8 shows a block diagram of the fourth robot system in the present embodiment. Referring to FIGS. 7 and 8, the fourth robot system is formed so that the installation table 4 is movable. The fourth robot system includes a moving device 61 which moves the installation table 4. The operation control unit 43 drives the moving device 61 via a moving device driving unit 62.

The moving device 61 includes a moving motor provided inside the installation table 4, and rails 8. The installation table 4 is arranged on the surfaces of the rails 8 and movable along the rails 8. By being driven by the moving device 61, the installation table 4 is moved in the direction in which the rails 8 extend, as depicted by arrows 98. At the back surface of the installation table 4 is arranged a workpiece operating table 5. In the fourth robot system, an operation is performed to arrange the workpieces W, which are placed on the installation table 4, at a plurality of positions on the workpiece operating table 5.

As the intrusion detector, the laser scanner devices 51a to 51c are adopted which are adopted in the first robot system. Preferably, the monitoring area 95 is established based on the distance from the robot 1. In the fourth robot system, when the installation table 4 is moved, the position of the robot 1 is also moved. The laser scanner devices 51a to 51c are fixed to the installation table 4 and thus moved with the installation table 4. Then, it is possible to judge whether or not a person has entered into the monitoring area 95 with the robot 1 as reference at the moved position. In other words, the monitoring area 95 can be moved in directions indicated by the arrows 98.

In this manner, in the fourth robot system, the monitoring area 95 can be moved with the installation table 95. Despite the movement of the installation table 4, it is possible to detect the intrusion of a person at the monitoring area 95 with the position of the robot 1 as reference.

While the mode of operation of the robot in the present embodiment is so that the robot automatically operates based on the operation program, there is no limitation to such a form, and it is also applicable in the case where the robot is manually operated by the operator operating an operation board.

According to the present invention, a robot system can be provided which enables the operator to easily grasp the operation state of the robot and restrains a person from carelessly approaching the robot.

In each of the above-described controls, the order of the steps can be arbitrarily changed within a scope which does not change the function and effect. The foregoing embodiments can be combined arbitrarily. In each of the above-described views, identical reference symbols are assigned to identical or equivalent parts. Meanwhile, the above-described embodiments are by way of example only, and do not restrict the present invention in any way. Further, the embodiments encompass changes to the embodiments set forth in the claims.

The invention claimed is:

1. A robot system, comprising:
   an intrusion detector which detects that a person has entered into a monitoring area established around a robot;
   an installation table which has an upper surface and a side surface, and supports the robot;
   a light emitting device which brightens the side surface of the installation table; and
   a control device which receives a signal outputted by the intrusion detector and controls the light emitting device, wherein
   the upper surface of the installation table is a working surface for workpieces, and
   the control device is configured to cause the light emitting device to emit light when it is detected that the person has entered into the monitoring area.

2. The robot system according to claim 1, wherein the light emitting device blinks when it is detected that the person has entered into the monitoring area.

3. The robot system according to claim 1, wherein
   the monitoring area includes a stopping area in which an operation of the robot is stopped when the person has entered thereinto, and a speed limiting area in which an operation speed of the robot is limited to a low speed when the person has entered thereinto,
   the intrusion detector is configured to detect the intrusion of the person into the stopping area and the intrusion of the person into the speed limiting area separately,
   the control device includes a light emission control unit which controls a color of light emitted by the light emitting device, and
   the light emission control unit performs at least one of control for changing the color of the light emitted by the light emitting device and control for causing the light emitting device to be lit off, depending on the case where the person has entered into the stopping area, the case where the person has entered into the speed limiting area, or the case where the person does not intrude into both of the stopping area and the speed limiting area.

4. The robot system according to claim 1, wherein
   the monitoring area includes a stopping area in which an operation of the robot is stopped when the person has entered thereinto, and a speed limiting area in which an operation speed of the robot is limited to a low speed when the person has entered thereinto,
   the intrusion detector is configured to detect the intrusion of the person into the stopping area and the intrusion of the person into the speed limiting area separately,
   the control device includes a light emission control unit which controls time intervals at which the light emitting device blinks, and
   the light emission control unit controls at least one of whether or not the light emitting device blinks and the blinking time intervals, depending on the case where the person has entered into the stopping area, the case where the person has entered into the speed limiting area, or the case where the person does not intrude into both of the stopping area and the speed limit area.

5. The robot system according to claim 1, further comprises a moving device which moves the installation table, wherein
   the monitoring area is moved with the movement of the installation table, and
   the intrusion detector is fixed to the installation table so as to move with the installation table and is configured to detect that the person has entered into the monitoring area established at a position to which the installation table is moved.

* * * * *